April 19, 1955     J. M. ROBERTSON     2,706,493
CONDUIT CONSTRUCTION
Filed Feb. 2, 1951     2 Sheets-Sheet 1
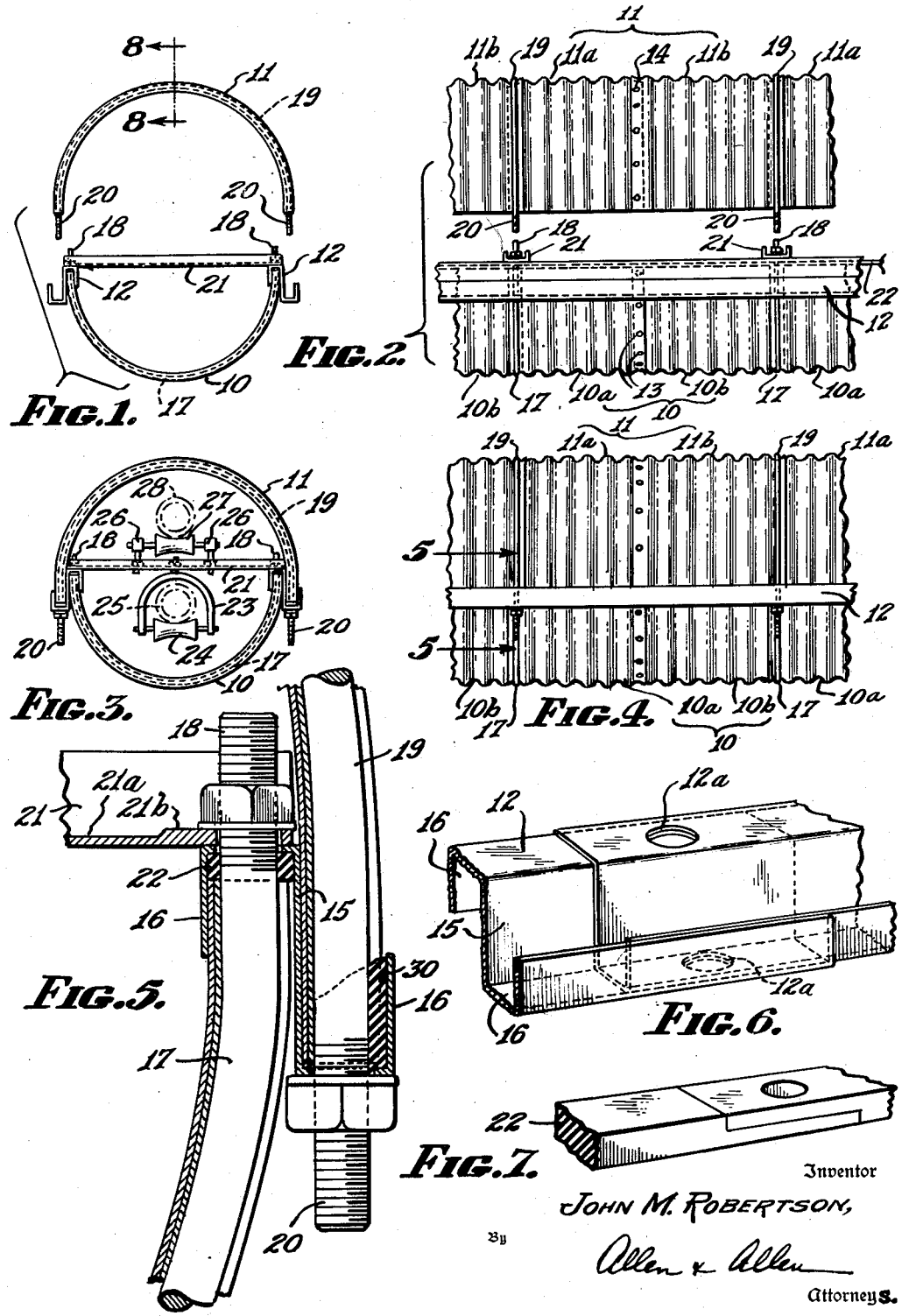
Inventor
JOHN M. ROBERTSON,
By
Allen & Allen
Attorneys.

April 19, 1955  J. M. ROBERTSON  2,706,493
CONDUIT CONSTRUCTION
Filed Feb. 2, 1951  2 Sheets-Sheet 2

Inventor
JOHN M. ROBERTSON,
By
Allen & Allen
Attorneys.

United States Patent Office 2,706,493
Patented Apr. 19, 1955

2,706,493

CONDUIT CONSTRUCTION

John M. Robertson, Middletown, Ohio, assignor to Armco Steel Corporation, Middletown, Ohio, a corporation of Ohio Application February 2, 1951, Serial No. 209,170

5 Claims. (Cl. 138—48)

This invention relates to conduits and more specifically to conduits or tunnels within which sewer, water, steam, gas, telephone or electrical lines are laid. Utility lines are often, if not usually, laid in tunnels in order that access may be had to the lines for repair and replacement purposes. Such tunnels generally are of monolithic concrete construction and are of a size that a human being can walk on the inside. Such tunnels are exceedingly expensive to construct and for this reason are undesirable in many installations.

This monolithic construction is in general use on many kinds of military establishments such as airfields, ordnance plants, research centers, etc., which may be primary bombing targets in time of war. Such construction if damaged is exceedingly difficult and time consuming to repair. My invention has the advantage of being very quickly and easily installed either in original installations or as repair sections. It has the added advantage of nestability from a shipping and storage standpoint.

The problem becomes particularly acute in regions where the ground is frozen throughout the year, as in northern climates such as Alaska. The problem is even more acute in Alaska because of the fact that the water is not treated and therefore the water lines must be replaced much more frequently than in most installations in the United States. In such areas some protection for underground water and sewer lines must be provided to prevent freezing. If these lines are enclosed in a single structure such as described herein, together with a steam line or lines, the heat loss from the insulated steam lines is sufficient to prevent the freezing of the water and sewer lines.

With these considerations in mind it is an object of the present invention to provide a conduit or tunnel construction for open trench installation within which utility lines can be laid which will be relatively inexpensive to install and by means of which access may be had for inspection or replacement or repair of the utility lines contained therein.

It is another object of the invention to provide a conduit construction utilizing corrugated sheet metal in prefabricated sections which can simply and expeditiously be installed and assembled in the field.

Another object of the invention resides in the provision of a construction as above outlined which will not require elaborate or complicated tools in the field and which will not require great skill or experience on the part of the workmen installing and assembling the conduit.

It is yet another object of the invention to provide a conduit which will be waterproof for all practical purposes. By this I do not mean that the conduit is absolutely waterproof because in this type of construction it generally is not of great significance if small trickles of water can have access to the interior. For this reason I use the term "practically waterproof."

These and various other objects of the invention which I shall point out in more detail hereinafter or which will suggest themselves to those skilled in the art upon reading these specifications I accomplish by that certain construction and arrangement of parts of which I shall now set forth certain exemplary embodiments. Reference is made to the drawings forming a part hereof and in which:

Figure 1 is an end elevational view of a lower and upper cooperating conduit portion.

Figure 2 is a side elevational view of the same.

Figure 3 is a view similar to Figure 1 showing the lower and upper portions assembled together and showing the manner in which utility lines may be supported within the conduit.

Figure 4 is a side elevational view of the same.

Figure 5 is a fragmentary cross sectional view taken on the line 5—5 of Figure 4 but on a greatly enlarged scale.

Figure 6 is a fragmentary perspective view of two adjacent Z sections showing a way in which they may be joined together.

Figure 7 is a fragmentary perspective view of a sponge rubber insert which may be used showing the manner in which a joint may be achieved.

Figure 8:
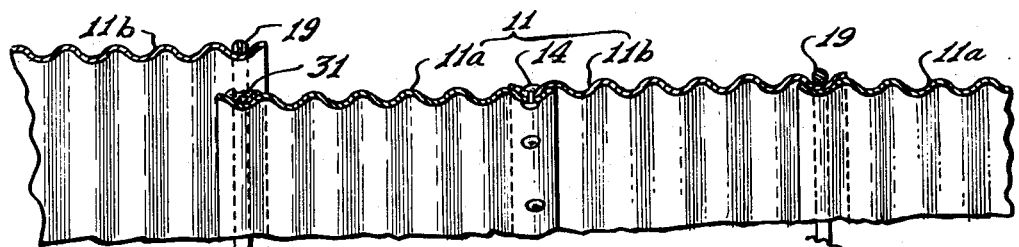
Figure 8 is a fragmentary cross sectional view taken on the line 8—8 of Figure 1 on an enlarged scale illustrating the construction more clearly.

Briefly, in the practice of my invention I provide a conduit consisting of lower and upper semi-cylindrical portions of corrugated sheet metal. The Z-shaped members are attached along the edges of the semi-cylindrical lower portion and provide a seat for the corresponding edges of the upper portion. Thus in Figure 1 there is shown a lower unit 10 and an upper unit 11, and Z-shaped attachment members are indicated at 12. As best seen in Figures 2 and 4, a unit 10 comprises the sections 10a and 10b which are riveted together as indicated at 13 in the shop. The sections 10a and 10b are lapped over one corrugation approximately with the section 10a lapping over the section 10b. When one unit 10, comprising the sections 10a and 10b, is assembled to an adjacent unit 10, comprising also a section 10a and 10b, the section 10a of one unit is lapped over the section 10b of the adjacent unit. This is clearly seen in Figures 2 and 4 and results in the advantage that the individual sections may be truly cylindrical and do not have to be tapered in order to achieve a continuous substantially constant diameter. Alternate sections 10a and 10b will differ in diameter substantially by the thickness of the sheet material of which they are made. Furthermore, by making the sections 10b slightly shorter peripherally than the sections 10a, the assembled sections 10a and 10b constituting the unit 10 may terminate in substantially straight line edges.

A similar construction is employed for the upper portion 11. Here again each unit 11 comprises a section 11a and a section 11b, and a section 11a and a section 11b are riveted together in the shop, as indicated at 14. In Figures 2 and 4 the sections of the units of the upper portion of the conduit have been shown as being lapped in the opposite direction with respect to those of the lower portion. It is to be understood that they could be lapped in either direction so long as all the sections of a top portion are lapped in the same sense and that all of the lower sections are lapped in the same sense. The particular directions shown are based on the assumption that the conduit is being laid in a ditch or trench starting at the right hand end of the figure. Thus a unit 10, including a section 10a and a section 10b, would be laid in a ditch as represented by the fragmentary section 10a at the right hand end of the figure. The succeeding unit 10 would then be laid with the section 10b inside the previously laid section 10a. This procedure would be repeated as the lower portion of the conduit is laid from right to left. Assuming that the upper portion of the conduit is also being assembled from right to left, a unit 11 would be placed in position with a section 11a over a corresponding section 10a and then a succeeding unit 11 would be emplaced with its section 11b overlapping the section 11a of the previous emplaced unit. It will be understood that if the entire lower portion has been laid from right to left it would be possible to lay the upper portion beginning at the left hand end of the figure in which case the sections would all be reversed.

The sections 10a, 10b, 11a and 11b are of course preformed in the shop to the required radius of curvature and as pointed out above sections 10a and 10b are riveted together so that as shipped there will be units 10, each comprising a section 10a and a section 10b, and units 11, each comprising a section 11a and a section 11b.

A series of Z elements 12 are provided and the elements 12 may be symmetrical and reversible. Each element 12 consists of a vertical web portion 15 and the opposed channel-shaped members 16. The width of the channel-shaped members is such that it corresponds to the depth of the corrugations, plus at least a thickness of the metal so that a channel member 16 may be slipped over a longitudinal edge of a series of sections 10a and 10b. A series of U-shaped rods 17 having the threaded ends 18 are provided, as well as a series of U-shaped rods 19 having the threaded ends 20. In the embodiment of Figures 1, 3 and 5 the channel members 21 are provided to extend transversely across the conduit.

In assembling the lower portion of a conduit according to the present invention a unit 10 is placed in position and then an adjacent unit 10 is emplaced with the end corrugation of its section 10b nested in the adjacent end corrugation of the section 10a. Z elements 12 are then placed in position with one of the channel members 16 engaged over the corrugated edges of the adjacent units 10, and U-shaped rod 17 is then passed under the lapped units fitting in a corrugation at the point of overlap and with the threaded ends 18 thereof extending upwardly through holes 12a in the Z-shaped elements 12 and through corresponding holes in a channel member 21. The assembly is completed by applying nuts to the threaded ends 18 and drawing them down tight.

In order to provide for practical waterproofness I prefer to provide strips of a sealing material such for example as sponge rubber and indicated at 22 which are laid in the channel member 16 before it is positioned over the edge of the conduit. When the nuts are drawn down tightly on the threaded ends 18 of the U-shaped rods 17 the material 22 is compressed and provides a seal for the joints.

As seen in Figure 5, the web portion 21a of the channel 21 is preferably thickened as at 21b in the region of the hole therethrough for reinforcing purposes. It will be understood that the channel 21 is not necessary in order that the lower conduit portion retain its shape. Its purpose is fundamentally for the mounting of supporting means for the various utility lines within the conduit. Thus for example as seen in Figure 3 a suspension member 23 may be secured to the channel 21 and may carry a roller 24 on which a utility line 25 may be supported. Similarly supports 26 may be provided also secured to the channel 21 for a roller 27 for yet another utility line 28. The particular suspension devices and supports do not form a part of the present invention and have only been indicated diagrammatically for such cases where there must be some axial movement of the pipe or utility line.

The sealing material strips 22 may be joined by a half-lap joint as shown in Figure 7 and the Z-shaped elements may be slightly tapered at their ends and joined by a lap joint as shown in Figure 6.

In emplacing the upper portion of the conduit a similar procedure is followed. The lower edges of the upper units 11 are placed in the channel members 16 which face upwardly and the U-shaped rods 19 are placed in position and drawn up tight by means of nuts. In the embodiment of Figure 5 the sealing material shown is asphalt, as indicated at 30, and this may be poured into the channel 16 before the unit 11 is placed in position. In this way the conduit is made practically waterproof.

In actual practice in laying a conduit according to the invention and as best seen in Figure 8 a layer of mastic is buttered into the corrugation which is to be lapped as indicated at 31. When the U-shaped rods 19 are then drawn tight, the mastic is caused to extrude between the lapping edges and make a good seal.

Figure 9:
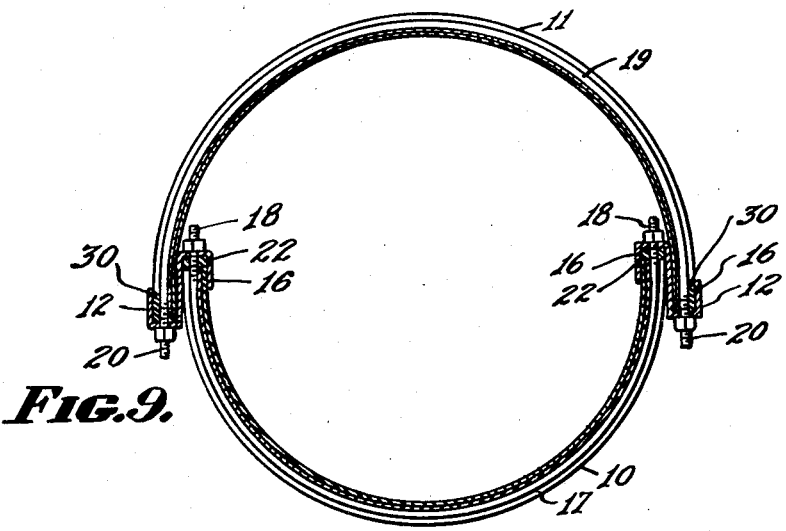
Figure 9 is a view similar to Figure 3 showing a slightly modified structure.
Figure 11:
Figure 11 is a fragmentary cross sectional view taken on the line 11—11 of Figure 10.

In Figure 9 I have illustrated a conduit where the channel members 21 have been omitted. This construction is suitable where it is not necessary to have suspension devices or supports for utility lines within the conduits.

Figure 10:
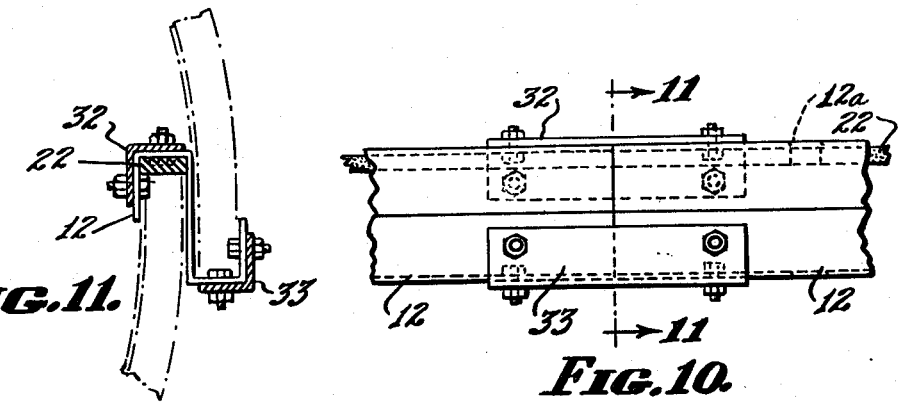
Figure 10 is a fragmentary elevational view of two abutting Z sections showing a different joint.

In Figure 10 I have indicated a different joint between adjacent Z elements. Here the adjacent Z elements 12 are simply butted against each other and are connected by two angle members 32 and 33.

As far as the sealing material 22 is concerned, it will be understood that it could be used in the lower channel 16 instead of the asphaltic material. Of course the asphaltic material is very much cheaper and since it can be poured into the lower channel it is a very convenient material to use. It cannot very well be used in the upper channel because it has to sustain itself in position while the Z-shaped element is being placed over the lower corrugated conduit portion. It will be understood that any suitable sealing material may be used and I am not limited except as specifically set forth in the claims. While I have shown sections 10a and 10b, and also sections 11a and 11b riveted together in the shop, it will be understood that I have found this to be convenient. Actually the field assembly units may consist of one, two or more sections. Modifications may be made also in the joining arrangement for the Z-shaped elements and the joining arrangement for the insulating material and in various other features without departing from the spirit of the invention. It will be understood therefore that the description herein has been exemplary only and that I am not limited except as set forth in the claims which follow.

Having now fully described my invention, what I claim as new and desire to secure by Letters Patent is:

1. A conduit for utility lines and the like, comprising upper and lower substantially cylindrical half portions, connecting members having mutually offset and oppositely directed open channels, the downwardly directed channels engaging the upwardly extending edges of the lower half portion and the upwardly directed channels engaging the downwardly extending edges of the upper half portion, the U-shaped rods passing around said lower half portion and secured to said downwardly directed channels, and U-shaped rods passing around said upper half portion and secured to said upwardly directed channels.

2. A conduit according to claim 1 in which strips of sponge rubber are provided between the upwardly extending edges of the lower half portion and said downwardly directed channels.

3. A conduit according to claim 1 in which strips of sponge rubber are provided between the upwardly extending edges of the lower half portion and said downwardly directed channels, and asphaltic material is provided in said upwardly directed channels, and the downwardly extending edges of said upper half portion are seated in said asphaltic material.

4. A conduit for utility lines and the like, comprising a lower half portion and an upper half portion, each said portion comprising a series of substantially semi-cylindrical sections of corrugated sheet metal in endwise lapping arrangement, Z-shaped members having channel portions engaged over the upper edges of the sections of said lower half portions, U-shaped rods embracing said lower half portion in the region of the lap of adjacent sections, the ends of said rods extending through said channel portions and having means for drawing said rods up tightly and holding them in position, externally disposed and upwardly open channel portions on said Z-shaped members, the lower edges of the sections of said upper half portion being seated in said last named channel portions, U-shaped rods embracing said upper half portion in the region of the laps of adjacent sections, the ends of said rods passing through said last named channel portions and provided with means for drawing said rods down tightly and holding them in position.

5. In a conduit for utility lines and the like, upper and lower substantially cylindrical half portions, each composed of a plurality of half cylindrical units, each unit consisting of at least two half cylindrical sections riveted together in lapping relation, said units being assembled in lapping relation with the laps between units being in the opposite sense to the laps between sections, the peripheral length of the lapping section of each unit being longer than that of the lapped section of said unit so that the edges of the lapping and lapped sections are substantially in a common diametral plane.

References Cited in the file of this patent

UNITED STATES PATENTS

| | | |
|---|---|---|
| 973,656 | Hess | Oct. 25, 1910 |
| 987,693 | Von Borries | Mar. 28, 1911 |
| 1,020,779 | Putney et al. | Mar. 19, 1912 |
| 1,243,441 | Patenaude | Oct. 16, 1917 |
| 1,611,438 | Hauser | Dec. 21, 1926 |
| 1,845,836 | Hauser | Feb. 16, 1932 |

FOREIGN PATENTS

| | | |
|---|---|---|
| 114,132 | Austria | Mar. 15, 1929 |